United States Patent [19]

Sprengel et al.

[11] 4,246,326
[45] Jan. 20, 1981

[54] MULTI-LAYER AUXILIARY ELECTRODE

[75] Inventors: Dietrich Sprengel; Helmut Hälbig, both of Kelkheim, Fed. Rep. of Germany

[73] Assignee: Varta Batterie, A.G., Hanover, Fed. Rep. of Germany

[21] Appl. No.: 42,568

[22] Filed: May 25, 1979

[30] Foreign Application Priority Data

Jun. 19, 1978 [DE] Fed. Rep. of Germany ....... 2826780

[51] Int. Cl.³ .......................................... H01M 10/34
[52] U.S. Cl. ..................................... 429/59; 429/212
[58] Field of Search ...................... 429/59, 58, 57, 212

[56] References Cited

U.S. PATENT DOCUMENTS 3,554,805   1/1971   Weinstock ........................... 429/58
4,113,924   9/1978   Kantner .............................. 429/58 X
4,143,212   3/1979   Ueno et al. ......................... 429/59 X Primary Examiner—Charles F. Lefevour
Attorney, Agent, or Firm—Weiser, Stapler & Spivak

[57] ABSTRACT

For oxygen reduction in a battery an auxiliary electrode is provided having two layers, one with hydrophilic characteristics, the other hydrophobic. The hydrophilic layer is preferably of activated carbon bound in plastic and the hydrophobic layer of porous polytetrafluoroethylene. Electrical contact is established between a conductor on the outside of the activated carbon layer and the negative main electrode. Preferably the exposed surface of the auxiliary electrode is provided with a metal ion barrier. Also preferably at least two such auxiliary electrodes are provided to make the battery orientation insensitive.

6 Claims, 1 Drawing Figure

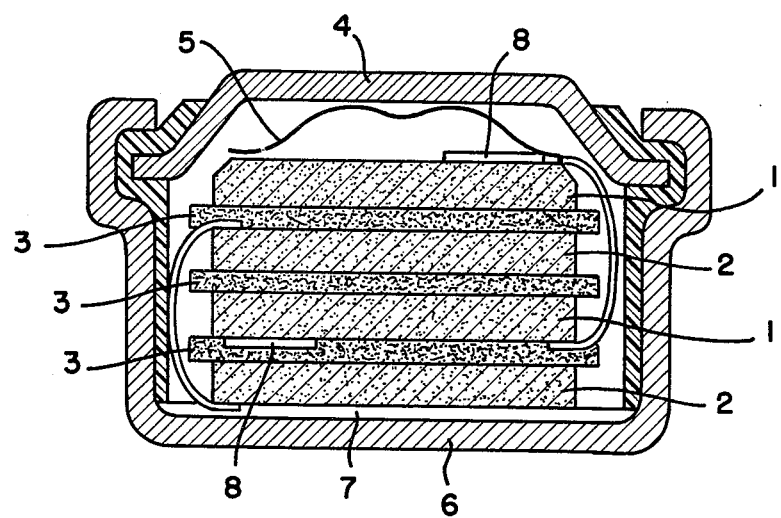

MULTI-LAYER AUXILIARY ELECTRODE

The invention relates to a galvanic element and particularly a storage battery which is closed in gas tight manner and which has positive and negative electrode plates and an auxiliary electrode conductively connected with the latter for reduction of oxygen pressure.

Gas tight storage batteries can be operated, particularly during overcharging, only with special safety measures which prevent the occurrence of an excessively high gas pressure inside the cell. In the simplest case, the negative electrodes, a portion of which must protrude from the electrolyte, may be made with greater dimensions than the positive electrodes so that the latter reach the gas evolution state during charging sooner than the negative electrodes. As a result the evolved oxygen gas is taken up by the only partially charged negative electrodes and thereby reduced.

Under practical conditions, however, this oxygen consumption rarely proceeds in such simple manner because it is dependent upon various determining factors which to some extent operate in opposite directions. Currently made gas tight cells therefore represent compromise solutions because they are capable of meeting each of the demands placed upon them only with certain reservations.

Thus, the electrolyte quantity above all represents a critical magnitude because, on the one hand, for reasons of overcharge safety one should work with a shortage of electrolyte while, on the other hand, the ability to load the cell with high currents requires a large amount of electrolyte.

Precise dosage of the electrolyte quantity is difficult because of varying take-up capacity of the electrodes.

The high internal pressure which is unavoidable during overcharging at high current frequently causes undesirable mechanical changes such as bulging, bursting and loss of sealing. These entail a decrease in electrical operating capability all the way to failure.

The disadvantages just described further demand structural measures such as for example greater wall thickness, massive containers, crimped edges and the like in order to absorb the high internal pressure. Flat prismatic configurations, which make good use of a predetermined volume, therefore have reduced likelihood of utilization.

The maximum attainable high current capacity which corresponds to a particular electrolyte quantity in accordance with the state of the art remains unreached because the use of this electrolyte quantity is impossible for other reasons.

In order to nevertheless cause the operating capacity of gas tight cells to reach the highest possible value it has been proposed, for example in German Patent Publication (Offenlegungsschrift) No. 1,104,005 and British Pat. No. 815,023, to promote gas consumption by means of an auxiliary electrode of cadmium which is electrically connected in parallel with the negative electrode. In addition there are known, for example from German Patent Publication (Offenlegungsschrift) No. 1,209,180 and British Pat. No. 1,017,084 other auxiliary electrodes for oxygen reduction with catalyst metals consisting preferably of silver thallium, copper and mercury.

However, all prior conventional auxiliary electrodes suffer from the common deficiency that it is not possible to maintain over an extended operating period the stable three phase equilibrium at their active surface which is indispensable for the oxygen conversion. This problem besets both alkaline and acid secondary cells in which auxiliary electrodes are introduced. The cells are generally so constructed that oxygen first evolves during charging which has progressed to a considerable extent, and this must be continuously removed from the auxiliary electrode. This, however, presupposes that it has a surface which is only slightly wetted by the electrolyte and whose active centers are always accessible to the gas.

Accordingly, it is an object of the present invention to provide an auxiliary electrode within a galvanic element which in particular has been closed in gas-tight manner, this auxiliary electrode being capable of reducing the accumulation of oxygen in the gas space to a minimum value even for high charging currents and to counteract even temporary excessive increases in the internal pressure.

This and other objects which will appear are achieved in accordance with the invention by making the auxiliary electrode in the form of a two layer electrode. The one of these layers which is to catalyze the oxygen reduction has hydrophilic characteristics, while the other layer has hydrophobic characteristics.

Particularly useful for the intended purpose is a two layer foil material in which the hydrophilic layer is made of activated carbon bound in synthetic plastic material and the hydrophobic layer is made of porous polytetrafluorethylene.

If desired, a metallic fabric grid is rolled into the outside of the activated carbon layer, and this in such manner that the meshes of the grid are tightly filled by the activated carbon while the metal remains exposed to such an extent that good electrically conductive contact is created with the negative electrode when a piece of the foil embodying the invention, which may be cut in any desired form, is pressed upon it. The metal fabric grid may be made of pure silver, nickel or nickel-plated iron.

The side of the foil with the polytetrafluorethylene layer which faces the gas space provides, on the one hand, for adequate gas access due to its porous structure to the activated carbon-containing layer. On the other hand, due to its hydrophobic characteristic, it prevents flooding of this layer by the electrolyte. As a result the foil, in its capacity as auxiliary electrode for oxygen consumption, can be operated for long periods of time with high current densities at the potential of the negative electrode metal.

The mechanism of oxygen reduction was heretofore most investigated with respect to cadmium electrodes and the nickel/cadmium storage battery works particularly reliably in gas-tight operation. Therefore, experiments with Ni/Cd button cells have been conducted to demonstrate that auxiliary electrodes according to the invention produce pronounced reduction of the oxygen partial pressure and also yield as a further advantage an increase in the high current capacity. Button cells with a rated capacity $NK = 225$ mAh were partially equipped with auxiliary electrodes of 1 cm$^2$ and 3 cm$^2$ respectively. In each case they were overcharged at 100 mA and discharged at 450 mA = 2 CA down to their discharge terminal potential of 0.9 volts.

The table below provides an overview of the results.

| Electrolyte Quantity | Capacity | P1 | 1cm² | P2 | 3cm² |
|---|---|---|---|---|---|
| normal | 35% NK | 5 bar | 0.1 bar | | 0.1 bar |
| +0.1 ml | 45% NK | 7 bar | 0.1 bar | | 0.1 bar |
| +0.2 ml | 55% NK | 9 bar | 0.1 bar | | 0.1 bar |
| +0.5 ml | 58% NK | 10 bar | 0.7 bar | | 0.3 bar |

P1 = Pressure for overcharging at 100 mA without auxiliary electrode
P2 = Pressure for overcharging at 100 mA with auxiliary electrode The effectiveness of the auxiliary electrode according to the invention mkaes it possible to dispense with the use of negative electrodes connected with he auxiliary electrode having dimensions which exceed those corresponding to their true purpose. In this manner active material which does not contribute to the useable capacity is conserved.

However, the auxiliary electrode has its optimum operating capability only when it is in the immediate vicinity of the gas space of the cell, where the three-phase boundary condition necessary for oxygen transformation is best realized. As can be seen from the table, the oxygen consumption diminishes with increasing electrolyte filling and the internal pressure rises. A similar result is observed when the button cell is operated upside down.

It is therefore a particular feature of the invention to electrically contact, in a gas-tight storage battery, both the uppermost as well as the lowermost of the negative electrodes in plan-parallel manner with an auxiliary electrode embodying the invention, and to arrange both of these so that they are located at positions in the cell which are as diametrically opposed to each other as possible.

For further details, reference is made to the discussion which follows in the light of the accompanying drawing wherein the single FIGURE shows a cross-sectional view of a button cell embodying this invention.

This button cell contains two negative electrodes 1 and two positive electrodes 2 in alternating sequence and spaced from each other by separators 3. The electrodes of the same polarity are short-circuited to each other. The cell cover 4 with its internal contact spring 5 also constitutes the negative terminal, the cell housing 6 with the bottom insert 7 the positive terminal of the battery.

To the upper negative electrode and to the lower negative electrode there are attached the auxiliary electrodes 8 with their hydrophilic layer side facing them and so positioned that the distance between them is as great as possible.

As a result if there takes place an electrolyte accumulation at one point inside the cell due to its orientation in which one of the auxiliary electrodes in the worst case is flooded, then at least the other auxiliary electrode is protected from flooding and remains fully operational.

Such a cell can receive electrolyte which is sufficient for high current dischargeability and which is also freely mobile, and can furthermore function independently of orientation.

A further feature of the invention is to prevent the penetration of dissolved metal ions, which emanate from the active material of the negative main electrode, into the hydrophilic layer of the auxiliary electrode. Otherwise, there would occur there a precipitation of the metal onto the activated carbon which would impair its catalytic activity. Such a danger exists not only for Ni/Cd storage batteries but also, for example, for lead cells and in general for all galvanic elements in which the anodic oxidation of the metal electrode proceeds via the solution phase.

It is therefore particularly advantageous that the auxiliary electrode embodying the invention be provided on its hydrophilic side with an additional barrier foil which, under the existing conditions, is permeable only to the OH ions which are formed by oxygen reduction at the activated carbon in accordance with the formula $\frac{1}{2}O_2 + H_2O + 2e - 2OH^-$. There may be used, for example, an ion exchange membrane. It can be pressed into the metal fabric grid of the hydrophilic side of the auxiliary electrode which lies adjacent the cadmium electrode or negative electrode, in such a manner that the mesh grid still remains adequately exposed to maintain the desired electrical contact with the main electrode. However, it is also possible to insert into the contact region between negative main electrode and auxiliary electrode a continuous barrier layer. In that case, the electrically conductive contact which is interrupted over its surface can be reestablished around the edge of the barrier layer by suitable connections between the metal fabric grid and the cadmium electrode. All that is important is the existence of an electrical contact between auxiliary electrode and negative main electrode, on the one hand, and an electrolytic connection which is established only by OH ions, on the other hand, which, as in the latter case, may also be spatially separated.

The advantages of the auxiliary electrode embodying the invention demonstrated by means of a nickel/cadmium button cell example and the preferred arrangement thereof are not limited to these types of cells but may be applied to all types of alkaline and acid storage batteries. Also, the application can extend to "open" storage batteries, i.e. those provided with valves, and particularly to those which are used in continuous charge operation.

The auxiliary electrode according to the invention may further be used to advantage in any galvanic element in which the oxygen consumption serves merely to prevent substantial water losses from the electrolyte, reduced maintenance need being then the objective. Even primary cells are within the scope of utilization of the auxiliary electrode, because many of these contain a highly oxidized positive electrode material which, as is the case for AgO, for example, tends to evolve oxygen.

We claim:

1. A galvanic element and particularly a gas-tight closed storage battery having positive and negative electrodes and having an auxiliary electrode electrically connected with the latter for reduction of oxygen pressure, wherein
   the auxiliary electrode is a two-layer electrode, one layer being capable of catalyzing the oxygen reduction and being hydrophilic and contacting the negative electrode, and
   the other layer having hydrophobic characteristics.
2. The element of claim 1 wherein
   the hydrophilic layer of the auxiliary electrode is made of activated carbon bound by plastic material, and
   the hydrophobic layer consists of a porous polytetrafluoroethylene foil.
3. The element of claim 1 wherein
   a metal fabric grid is rolled onto the hydrophilic layer of the auxiliary electrode.

4. The element of claim 3 wherein
the metal fabric grid consists of materials selected from the group of pure silver, nickel and nickel-plated iron.

5. The element of claim 1 having at least two auxiliary electrodes at diametrically opposite locations in the cell, one of said auxiliary electrodes being in firm electrically conductive contact with the topmost negative electrode, while the other auxiliary electrode is in firm electrically conductive contact with the lowermost negative electrode.

6. A galvanic element and particularly a gas-tight closed storage battery having positive and negative electrodes and having an auxiliary electrode electrically connected with the latter for reduction of oxygen pressure, wherein
the auxiliary electrode is a two-layer electrode, one layer being capable of catalyzing the oxygen reduction and being hydrophilic,
the other layer having hydrophobic characteristics,
said galvanic element having at least two auxiliary electrodes at diametrically opposite locations in the cell, one of said auxiliary electrodes being in firm electrically conductive contact with the topmost negative electrode, while the other auxiliary electrode is in firm electrically conductive contact with the lowermost negative electrode.

* * * * *